United States Patent
Rawlinson

(10) Patent No.: US 9,073,397 B1
(45) Date of Patent: *Jul. 7, 2015

(54) COMPACT REAR SUSPENSION DAMPER-SPRING ASSEMBLY

(71) Applicant: Atieva, Inc., Redwood City, CA (US)

(72) Inventor: Peter Dore Rawlinson, Worcestershire (GB)

(73) Assignee: ATIEVA, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/512,486

(22) Filed: Oct. 13, 2014

Related U.S. Application Data

(63) Continuation-in-part of application No. 14/172,147, filed on Feb. 4, 2014, now Pat. No. 8,905,416.

(51) Int. Cl.
*B60G 15/00* (2006.01)
*B60G 13/00* (2006.01)
*B60G 3/20* (2006.01)

(52) U.S. Cl.
CPC .......... *B60G 15/00* (2013.01); *B60G 2200/144* (2013.01); *B60G 2204/128* (2013.01); *B60G 13/006* (2013.01); *B60G 3/20* (2013.01)

(58) Field of Classification Search
CPC ........ B60G 15/00; B60G 3/20; B60G 13/006; B60G 2200/144; B60G 2204/128
See application file for complete search history.

(56) References Cited

U.S. PATENT DOCUMENTS

| | | | |
|---|---|---|---|
| 4,883,288 A | 11/1989 | Finn et al. |
| 5,868,410 A | 2/1999 | Kawabe et al. |
| 6,036,201 A | 3/2000 | Pond et al. |
| 6,113,120 A | 9/2000 | Heap |
| 6,250,659 B1 | 6/2001 | Morris |
| 7,168,717 B2 | 1/2007 | Wubben et al. |
| 8,534,686 B1 | 9/2013 | Slawson |
| 2005/0110235 A1 | 5/2005 | LeBlanc et al. |
| 2005/0200094 A1 | 9/2005 | Hozumi |
| 2006/0055141 A1 | 3/2006 | Geusens |
| 2010/0117320 A1 | 5/2010 | Grozev et al. |
| 2012/0043736 A1 | 2/2012 | Okamoto et al. |

FOREIGN PATENT DOCUMENTS

DE     10 2011 000357 A1     8/2012

*Primary Examiner* — Faye M Fleming
(74) *Attorney, Agent, or Firm* — Patent Law Office of David G. Beck

(57) ABSTRACT

A vehicle wheel suspension system that achieves increased width in the passenger and/or luggage compartment is provided. The suspension system utilizes a (i) a wheel support member that is positioned between the inner and outer tire planes; (ii) a nonlinearly-shaped damper-spring support member that is rotatably attached to the wheel support member; (iii) a damper-spring mounting platform that is positioned above, and at least partially overlaps, the tire, and that is rotatably attached to the nonlinearly-shaped damper-spring support member; and (iv) a damper-spring assembly mounted to the damper-spring mounting platform and coupled to a vehicle body structure.

17 Claims, 5 Drawing Sheets

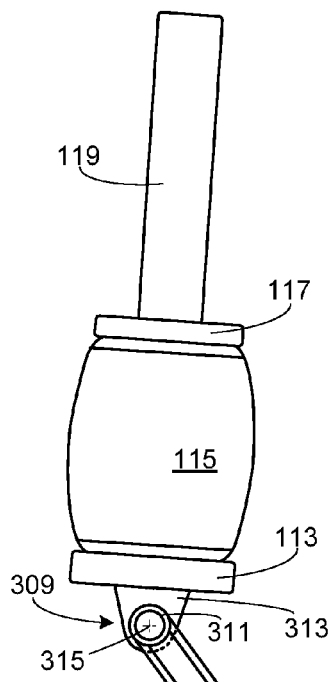
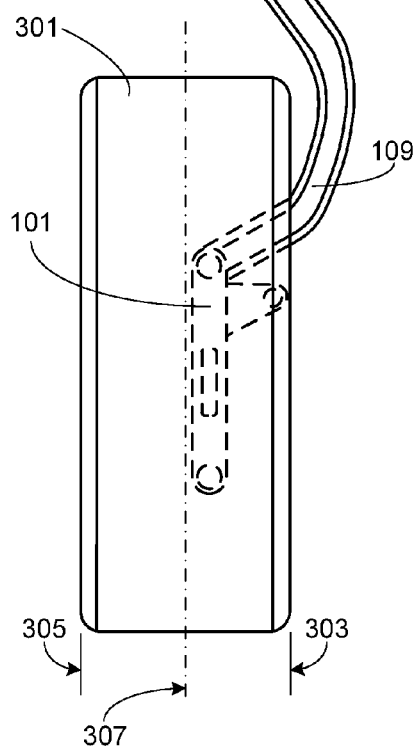
FIG. 3
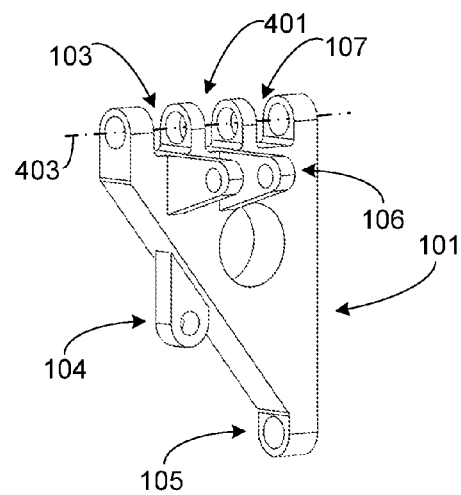
FIG. 4
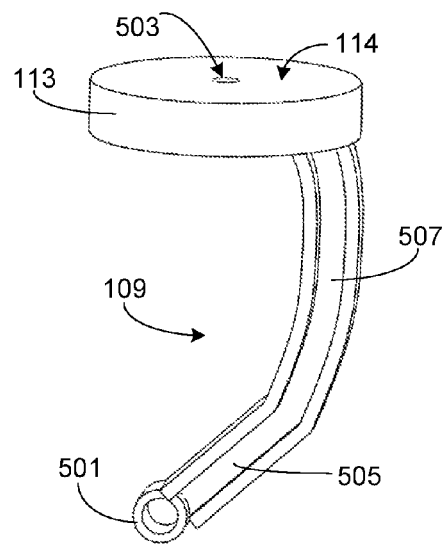
FIG. 5

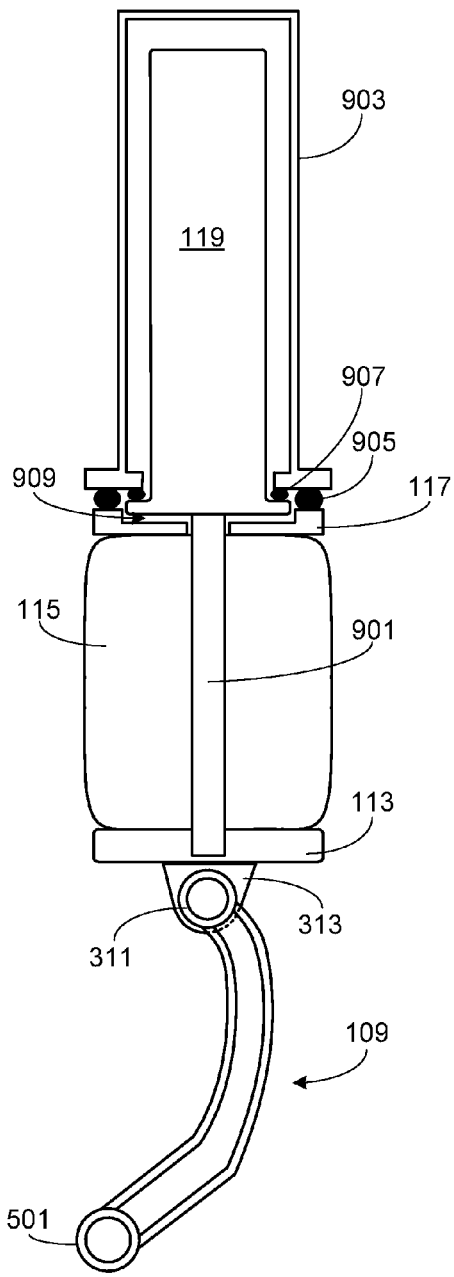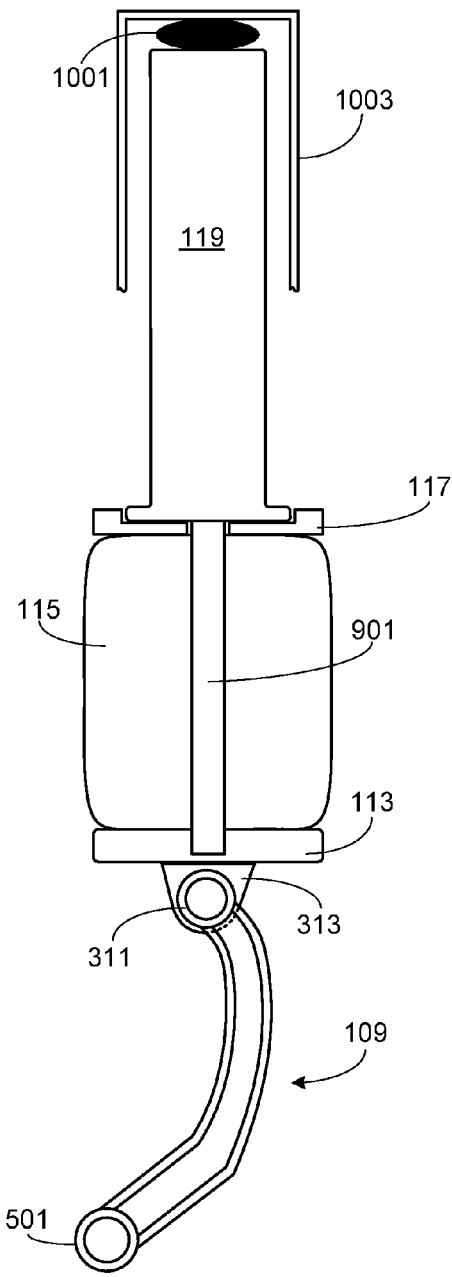

COMPACT REAR SUSPENSION DAMPER-SPRING ASSEMBLY

CROSS-REFERENCE TO RELATED APPLICATION

This application is a continuation-in-part of U.S. patent application Ser. No. 14/172,147, filed 4 Feb. 2014, the disclosure of which is incorporated herein by reference for any and all purposes.

FIELD OF THE INVENTION

The present invention relates generally to automobiles and, more particularly, to a rear suspension damper-spring assembly.

BACKGROUND OF THE INVENTION

When configuring a vehicle's suspension, the primary considerations for the automobile designer are the design goals set for passenger ride comfort and overall vehicle performance. In general the designer first selects the type of suspension required by the style of vehicle, i.e., high performance car, luxury sedan, compact economy car, SUV, etc., and then configures and adjusts the selected type of suspension to meet the specific design goals set for the vehicle.

Various suspension types exist, each of which provides specific driving characteristics. One common characteristic of each type of suspension, however, is the in-board mounting of the damper and spring assembly regardless of whether or not the damper and spring are coaxially mounted. This in-board mounting scheme is illustrated in the torsion beam rear wheel suspension system disclosed in U.S. Pat. No. 7,946,600. In this system one end of each arm of a pair of trailing arms is pivotally supported by the vehicle body via a rubber bush joint. The other end of each trailing arm extends outward and rearward and supports the corresponding rear wheel via a hub bearing unit. At intermediate locations, the two trailing arms are connected to, and separated by, a torsion beam. Located between the torsion beam coupling and the hub bearing unit of each trailing arm is a spring seat, thus providing means for resiliently supporting the trailing arm with a coil spring interposed between the spring seat and the vehicle body. A damper, located behind the coil spring, extends between the corresponding trailing arm and the vehicle body. A similar suspension configuration is disclosed for use with an in-wheel motor in U.S. Pat. No. 8,220,808.

A different type of suspension, typically referred to as a multi-link suspension, is disclosed in U.S. Pat. No. 6,938,908. In the disclosed suspension assembly each wheel support is connected to the vehicle body using five links. A coaxially arranged damper-coil spring assembly is interposed between the vehicle body and an inward projection of the wheel support. When viewed from the side, the damper-coil spring assembly extends in a substantially vertical direction while the assembly, when viewed from the rear, angles slightly inward towards the vehicle's centerline. A similar suspension configuration is disclosed in U.S. Pat. No. 5,507,510.

Yet another type of suspension, commonly referred to as a double wishbone suspension, is disclosed in U.S. Pat. No. 6,945,541. In this type of suspension the wheel mount is coupled to upper and lower control arms via ball joints, where each substantially horizontal control arm is approximately parallel to the road surface. A coaxial damper-spring assembly is interposed between the wheel mount and the vehicle body and positioned such that it is substantially vertical when viewed from the side, and angled inwards towards the vehicle's centerline when viewed from the rear.

Regardless of the type of suspension, in general the damper-spring assembly angles inwardly towards the vehicle's centerline when viewed from the rear of the car. The degree to which the assembly intrudes upon either the passenger compartment or the luggage compartment depends both on the angle of the assembly and the mounting location of the assembly relative to the wheel mount. The configuration of the assembly, for example whether or not the damper and spring are coaxially mounted and where the spring is mounted relative to the damper and wheel mount, also impacts the degree of interior space intrusion. Accordingly, what is needed is a damper-spring assembly that minimizes interior space intrusion while still achieving the desired level of ride comfort and vehicle performance. The present invention provides such a damper-spring assembly.

SUMMARY OF THE INVENTION

The present invention provides a vehicle wheel suspension system that achieves increased width in the passenger and/or luggage compartment while still providing optimal ride characteristics. The wheel suspension system is comprised of (i) a wheel support member that is positioned between the inner and outer tire planes, and preferably in-board of the tire centerline, and that is configured to support a wheel-carrying spindle and that includes a plurality of mounts configured to accept a plurality of rotatably connected linkage arms; (ii) a nonlinearly-shaped damper-spring support member, where the first end of the support member, which may be comprised of a bushing collar, is rotatably connected to the wheel support member and is located between the inner and outer tire planes; (iii) a damper-spring mounting platform, where the second end of the nonlinearly-shaped damper-spring support member, which may be comprised of a bushing collar, is rotatably connected to the damper-spring mounting platform and where the damper-spring mounting platform is positioned above and at least partially overlaps the tire coupled to the wheel-carrying spindle; and (iv) a damper-spring assembly mounted to the damper-spring mounting platform and coupled to a vehicle body structure. The damper and spring comprising the damper-spring assembly are preferably coaxially mounted and configured such that the load path directed along the axis of the coaxially mounted damper-spring assembly intersects the underlying road surface at approximately the center of the tire contact patch. The spring of the damper-spring assembly may rest on the damper-spring mounting platform, and preferably be captured between the damper-spring mounting platform and a spring retaining member, while the damper rod may pass through the spring and be coupled, e.g., bolted, to the damper-spring mounting platform. The spring of the damper-spring assembly may be comprised of an air spring or a coil spring. The member that connects the first end to the second end of the nonlinearly-shaped damper-spring support member may be comprised of at least one straight segment and at least one curved segment; alternately, of a single continuously curved segment; alternately, of multiple straight segments.

A further understanding of the nature and advantages of the present invention may be realized by reference to the remaining portions of the specification and the drawings.

BRIEF DESCRIPTION OF THE DRAWINGS

FIG. 3 provides a front view of the embodiment illustrated in FIGS. 1 and 2;

FIG. 4 provides a detailed perspective view of the wheel support member illustrated in FIGS. 1-3;

FIG. 5 provides a detailed perspective view of the spring support member illustrated in FIGS. 1-3;

FIG. 9 schematically illustrates the primary components associated with the damper-spring assembly shown in FIGS. 1-3;

FIG. 10 schematically illustrates an alternate vehicle mounting configuration.

DESCRIPTION OF THE SPECIFIC EMBODIMENTS

Figure 1:
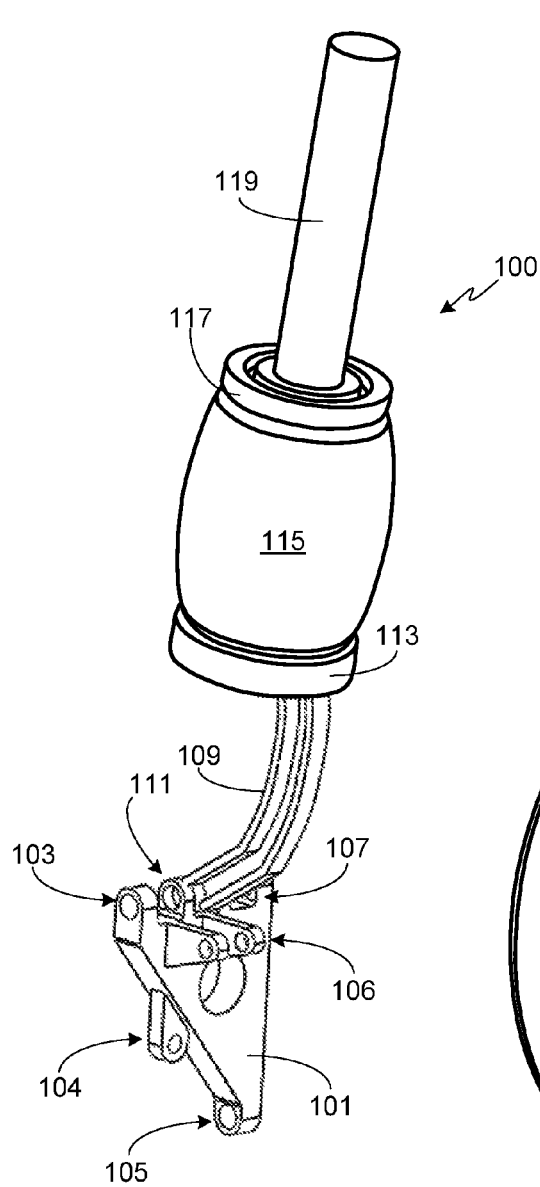
FIG. 1 provides a perspective view of a damper-spring assembly in accordance with the invention.
Figure 2:
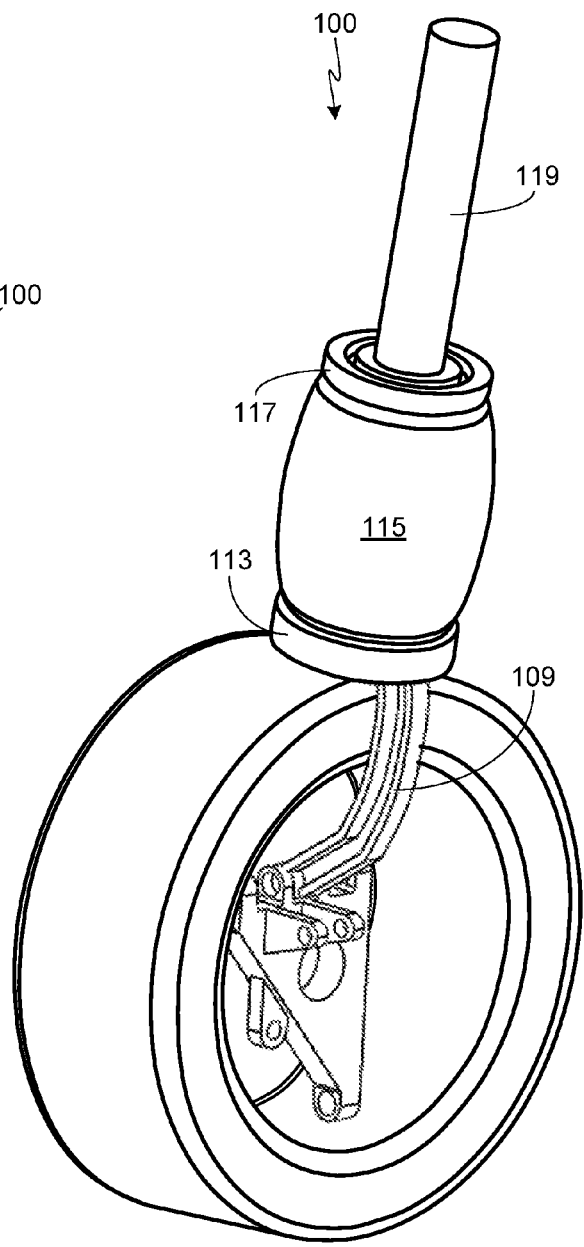
FIG. 2 provides a similar view of the damper-spring assembly shown in FIG. 1 with the addition of a tire, thereby illustrating the position of the damper-spring assembly relative to the tire.

FIGS. 1-3 illustrate a vehicle suspension assembly 100 in accordance with a preferred embodiment of the invention. Although assembly 100 may be utilized in any of a variety of different vehicle suspension types, both front and rear, preferably it is used in a multi-link rear suspension configured to achieve superior ride characteristics while providing increased width in the passenger and/or luggage compartment.

Figure 8:
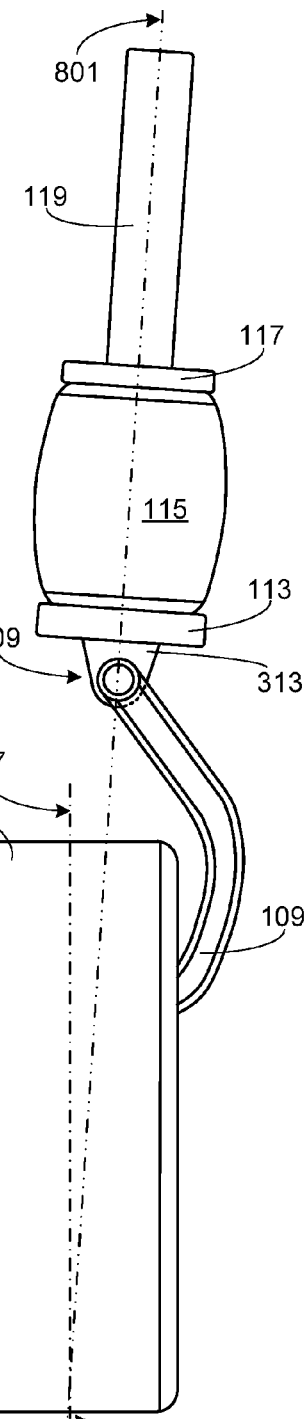
FIG. 8 illustrates the alignment of the damper-spring assembly relative to the tire and road surface.

FIGS. 1 and 2 provide a perspective view of damper-spring assembly 100, FIG. 2 including a tire in order to illustrate the location of the assembly relative to the tire. FIG. 3 provides a front view of damper-spring assembly 100. Disposed at the end of assembly 100 is a wheel support member 101. Wheel support member 101 is configured to support a wheel-carrying spindle, not shown, and provides multiple mounts for coupling multiple independent linkage arms, i.e., links, that couple the wheel support member to the vehicle body. For clarity, the links, wheel-carrying spindle, wheel and tire are not shown in FIG. 1, although the tire is shown in FIGS. 2, 3 and 8 in order to illustrate the location of the damper-spring assembly 100 relative to the tire.

In the illustrated embodiment, member 101 provides five linkage mounts 103-107, each of which allows a corresponding linkage arm to be rotatably coupled to the wheel support member 101. Note that after assembly and as illustrated in FIG. 3, wheel support member 101 is located between inner tire plane 303 and outer tire plane 305 of tire 301, and preferably in-board of tire centerline 307, i.e., relative to tire centerline 307 member 101 is located closer to inner tire plane 303 and the vehicle's centerline rather than closer to outer tire plane 305 and the outer envelope of the vehicle. FIG. 4 provides a detailed perspective view of wheel support member 101.

Coupled to wheel support member 101 is a nonlinearly-shaped damper-spring support member 109. FIG. 5 provides a detailed perspective view of spring support member 109. The lower end of member 109 is rotatably connected to wheel support member 101 via a rotational connection generally designated 111, where rotational connection 111 is preferably located between inner tire plane 303 and outer tire plane 305 as illustrated. Although a variety of rotational connections 111 are contemplated that would allow member 109 to pivot about wheel support member 101, in the preferred and illustrated embodiment a bushing within collar 501 is captured by a pin or bolt fastener (not visible) within mount 401 of member 101, thus allowing the damper-spring support 109 to rotate about axis 403 of wheel support member 101. In an alternate embodiment, rotational connection 111 is comprised of a ball joint.

The upper end of member 109 is rotatably connected to a damper-spring mounting platform 113 via a rotational connection generally designated 309. A variety of rotational connections 309 are contemplated that would allow mounting platform 113 and the attached damper-spring assembly to pivot about member 109, although in the preferred and illustrated embodiment a bushing within collar 311 is captured by a pin or bolt fastener (not visible) within mount 313 of mounting platform 113, thus allowing the damper-spring assembly attached to platform 113 to rotate about axis 315 of member 109. In an alternate embodiment, rotational connection 309 is comprised of a ball joint.

In the preferred embodiment, the lower end of spring 115 rests on surface 114 of platform 113, and is captured between mounting platform 113 and a spring retaining member 117. The inventor envisions that spring 115 may consist of either a coil spring or an air spring. The damper rod, not visible in FIGS. 1-3, is coupled to mounting platform 113. Preferably the damper rod is bolted to mounting platform 113 via a threaded hole 503. Preferably damper 119 and spring 115 are coaxially mounted to mounting platform 113.

Figure 6:
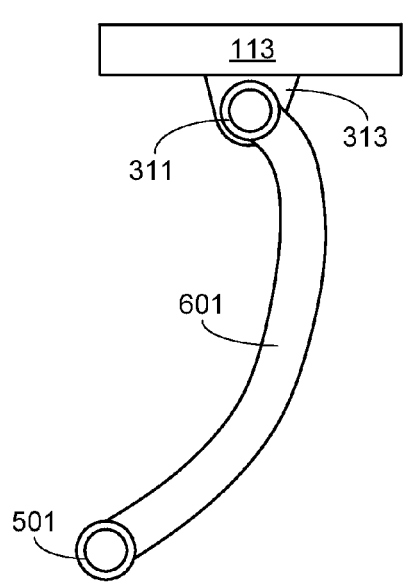
FIG. 6 provides a side view of an alternate spring support member comprised of a continuously-curved element interposed between the rotational coupling and the spring platform.
Figure 7:
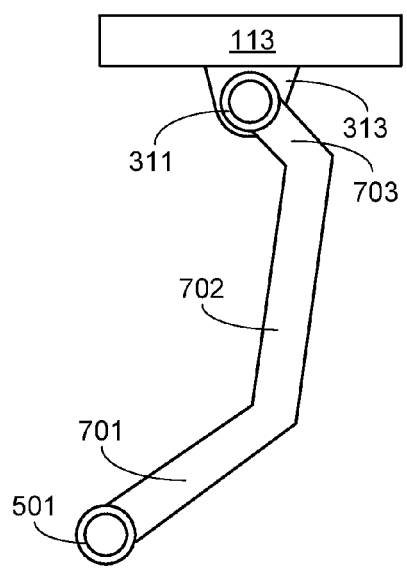
FIG. 7 provides a side view of an alternate spring support member comprised of a series of straight elements interposed between the rotational coupling and the spring platform.

In the preferred embodiment, nonlinearly-shaped member 109 is comprised of a straight portion 505 and a curved portion 507. It should be appreciated, however, that the shaped member may be comprised of a continuously curved member 601 such as that utilized in the exemplary member illustrated in FIG. 6, or comprised of a series of straight sections 701-703 such as that utilized in the exemplary member illustrated in FIG. 7.

The use of a nonlinearly-shaped member to couple wheel mount 101 to damper 119 and spring 115 allows the damper-spring unit to overlap tire 301. Furthermore in at least one preferred embodiment, and as illustrated in FIGS. 3 and 8, collars 311 and 501 are positioned on the axis of damper 119. As a result, loads are directed along axis 801 towards the center 803 of the tire contact patch with the road surface. Additionally, since the damper-spring units are mounted over the tires, the separation distance between the left vehicle and right vehicle damper-spring units is substantially increased over that achievable utilizing a conventional suspension, thereby providing increased passenger and/or luggage compartment space in this region of the vehicle. Lastly, since the damper-spring unit is rotatably connected to support member 109, tire 301 can change camber, for example when the car travels over a bump, without imparting lateral force on the end of the assembly, thereby resulting in smoother damping.

FIG. 9 schematically illustrates the primary components associated with the damper-spring assembly 100. Spring 115, which may be a coil spring or an air spring, is positioned between mounting platform 113 and spring retaining member 117. Assuming a coaxial damper/spring assembly as preferred, damper rod 901 passes through the center of the spring and is attached to mounting platform 113. The entire assembly passes through, and is attached to, a portion 903 of the vehicle structure. Bushings 905 and 907, preferably rubber bushings, are interposed between vehicle body portion 903 and damper-spring assembly 100 as shown. Note that in the preferred embodiment, the damper and the spring are independently mounted to the vehicle structure, thus allowing a gap 909 to be formed between damper 119 and spring retaining member 117 as shown. By including gap 909 rather than rigidly coupling the damper to the spring, motion of the damper and spring are decoupled.

While the mounting configuration shown in FIG. 9 is preferred, it will be appreciated that the invention may utilize other mounting configurations. For example and as illustrated in FIG. 10, the damper-spring assembly may be mounted to the vehicle body at the top of the assembly. In such a configuration a bushing 1001, preferably fabricated from rubber, is interposed between the damper 119 and vehicle body 1003.

Figure 11:
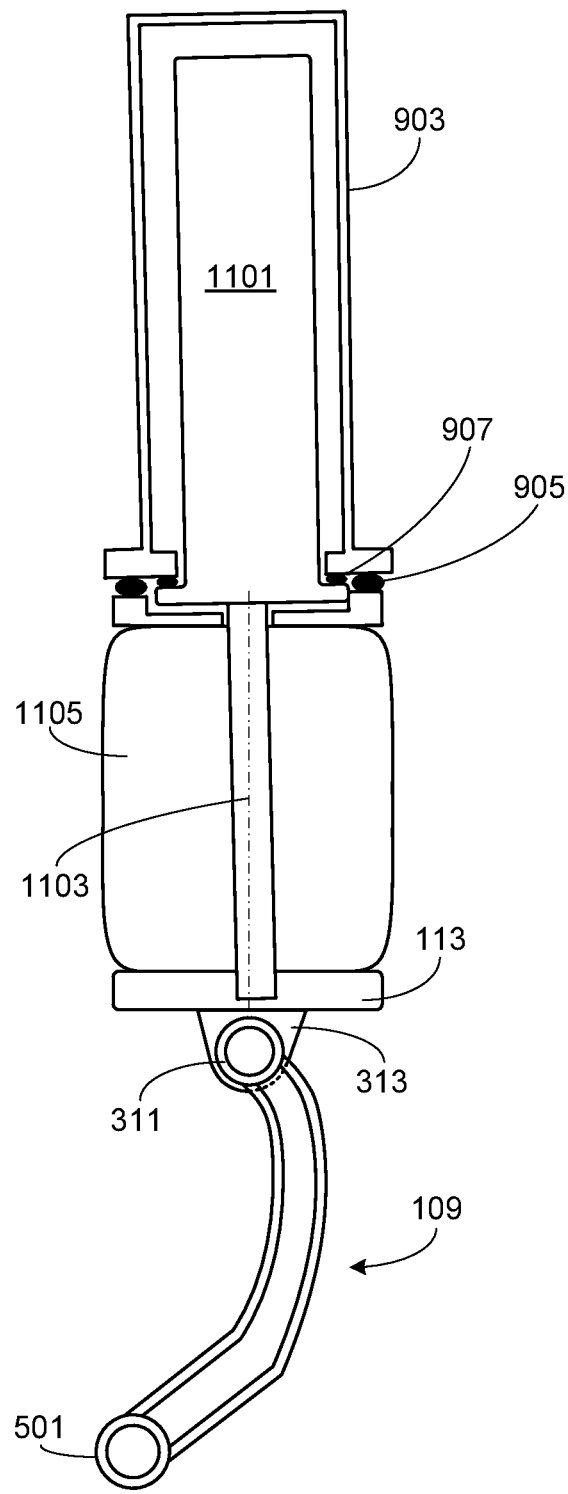
FIG. 11 illustrates a configuration in which the damper and spring are misaligned and offset from one another.

Although the preferred configuration is optimized for both performance and passenger compartment spacing, it should be appreciated that the shaped damper-spring support 109 may be used with other suspension configurations. For example, the order of the damper and spring in the damper-spring assembly may be reversed, although such an arrangement will clearly impact the passenger compartment spacing. Similarly, while coaxial mounting of the spring and damper is preferred, in at least one embodiment the axes of the spring and the damper are misaligned and offset from one another. FIG. 11 illustrates one such embodiment, this embodiment based on the configuration shown in FIG. 9. In this exemplary embodiment damper 1101 is misaligned and offset relative to axis 1103 of spring 1005.

It should be understood that the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A wheel suspension system, comprising:
   a wheel support member positioned between an outer tire plane and an inner tire plane, wherein said wheel support member is configured to support a wheel-carrying spindle, and wherein said wheel support member includes a plurality of mounts configured to accept a plurality of rotatably connected linkage arms;
   a nonlinearly-shaped damper-spring support member, wherein a first end of said nonlinearly-shaped damper-spring support member is rotatably connected to said wheel support member, wherein said first end of said nonlinearly-shaped damper-spring support member is located between said outer tire plane and said inner tire plane;
   a damper-spring mounting platform, wherein a second end of said nonlinearly-shaped damper-spring support member is rotatably connected to said damper-spring mounting platform, and wherein said damper-spring mounting platform is positioned above and at least partially overlaps a tire coupled to said wheel-carrying spindle mounted on said wheel support member; and
   a damper-spring assembly mounted to said damper-spring mounting platform and coupled to a vehicle body structure.

2. The wheel suspension system of claim 1, said damper-spring assembly comprising a damper and a spring, wherein said damper and said spring are coaxially mounted.

3. The wheel suspension system of claim 2, wherein said first end of said nonlinearly-shaped damper-spring support member is comprised of a first bushing collar, wherein said second end of said nonlinearly-shaped damper-spring support member is comprised of a second bushing collar, and wherein said first bushing collar and said second bushing collar are each positioned on a damper-spring assembly axis.

4. The wheel suspension system of claim 2, wherein a load path directed along an axis corresponding to said coaxially mounted damper-spring assembly intersects an underlying road surface at an approximate center of a tire contact patch.

5. The wheel suspension system of claim 2, wherein a first portion of said spring rests on said damper-spring mounting platform, and wherein a damper rod passes through said spring and is coupled to said damper-spring mounting platform.

6. The wheel suspension system of claim 5, wherein said damper rod is bolted to said damper-spring mounting platform.

7. The wheel suspension system of claim 5, further comprising a spring retaining member, wherein said spring is captured between said damper-spring mounting platform and said spring retaining member.

8. The wheel suspension system of claim 7, wherein said spring and said damper are independently mounted to said vehicle body structure, and wherein said damper is spaced apart from said spring retaining member.

9. The wheel suspension system of claim 2, wherein said spring is comprised of an air spring.

10. The wheel suspension system of claim 2, wherein said spring is comprised of a coil spring.

11. The wheel suspension system of claim 1, said damper-spring assembly comprising a damper and a spring, and wherein said damper is misaligned and offset relative to said spring.

12. The wheel suspension system of claim 1, wherein said wheel support member is positioned in-board of a tire centerline.

13. The wheel suspension system of claim 1, wherein said first end of said nonlinearly-shaped damper-spring support member is connected to said second end of said nonlinearly-shaped damper-spring support member by a member comprised of at least one straight segment and at least one curved segment.

14. The wheel suspension system of claim 1, wherein said first end of said nonlinearly-shaped damper-spring support member is connected to said second end of said nonlinearly-shaped damper-spring support member by a continuously curved member.

15. The wheel suspension system of claim 1, wherein said first end of said nonlinearly-shaped damper-spring support member is connected to said second end of said nonlinearly-shaped damper-spring support member by a member comprised of multiple straight segments.

16. The wheel suspension system of claim 1, wherein said first end of said nonlinearly-shaped damper-spring support member is comprised of a bushing collar.

17. The wheel suspension system of claim 1, wherein said second end of said nonlinearly-shaped damper-spring support member is comprised of a bushing collar.

\* \* \* \* \*